July 10, 1956 E. L. FAUST ET AL 2,754,032
FERTILIZER DISTRIBUTOR

Filed Aug. 3, 1953 2 Sheets-Sheet 1

INVENTOR
ELLWOOD L. FAUST
ROBERT R. HARTER

Paul O. Pippel

ATTORNEY

July 10, 1956   E. L. FAUST ET AL   2,754,032
FERTILIZER DISTRIBUTOR
Filed Aug. 3, 1953   2 Sheets-Sheet 2
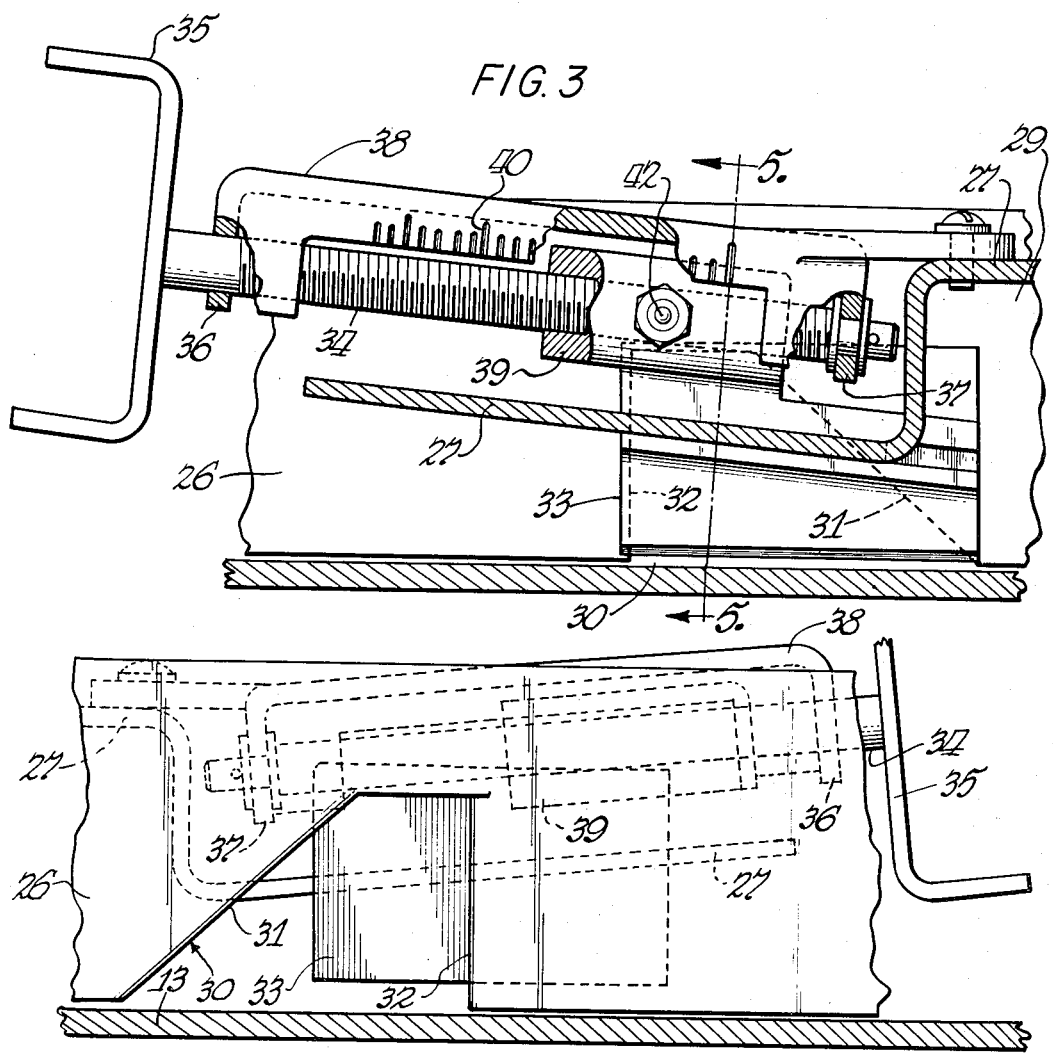
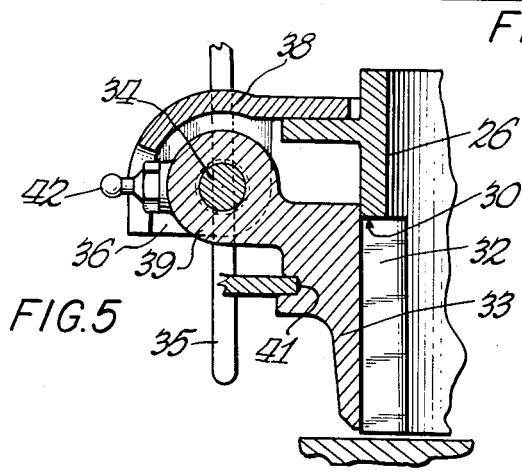
INVENTORS
ELLWOOD L. FAUST
ROBERT R. HARTER
ATTORNEY

United States Patent Office 2,754,032
Patented July 10, 1956

2,754,032
FERTILIZER DISTRIBUTOR

Ellwood L. Faust, Richmond, and Robert R. Harter, Fountain City, Ind., assignors to International Harvester Company, a corporation of New Jersey Application August 3, 1953, Serial No. 371,906

7 Claims. (Cl. 222—311)

This invention relates to material distributors such as the fertilizer dispensers used in the agricultural implement industry. The invention is particularly concerned with the type of fertilizer distributors associated with a planter, such as a potato planter.

There are a number of problems involved in the dispensing of commercial fertilizers in high speed planting operations, and one of these problems is the tendency of commercial fertilizers to compact, bridge, and otherwise interpose difficulties inherent in the character of the material. It has been found that fertilizer is most uniformly discharged from hopper openings if a minimum of obstructions are present in the hopper to interfere with the movement of the fertilizer to discharge outlets.

Another of the difficulties in dispensing commercial fertilizer from the conventional hopper is the proper control of the quantities of fertilizer to be discharged upon the ground in accordance with the operator's particular requirements. An object of the invention, therefore, is to provide an improved fertilizer distributor having features incorporated therein designed to overcome the difficulties referred to.

Another object of the invention is the provision of an improved material discharge mechanism and hopper construction wherein the obstacles to uniform discharge of fertilizer from the hopper are reduced to a minimum.

A further object of the invention is the provision in fertilizer discharge mechanism, of improved means for regulating the rate of discharge of fertilizer from a hopper.

Other objects and advantages of the invention will become clear from the following detailed description when read in conjunction with the accompanying drawings, wherein:

Figure 3 is an enlarged detail, partly in section taken on the line 3—3 of Figure 1;

Figure 4 is a side elevation from the interior of the hopper, on the line 4—4 of Figure 1, showing one of the discharge outlets in the wall of the hopper and the relationship of the gate or closure means thereto; and Figure 5 is a section on the line 5—5 of Figure 3.

Figure 1:
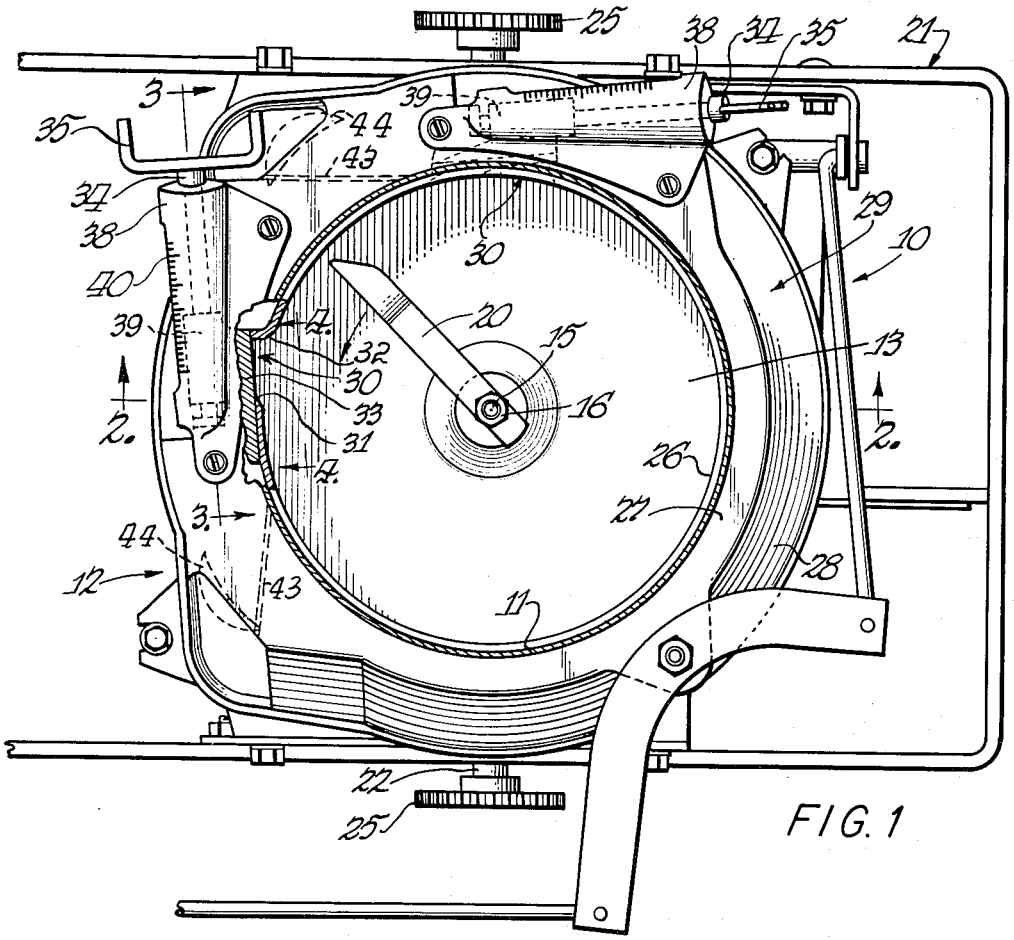
Figure 1 is a plan view, partly in section, of the bottom of a fertilizer distributor having incorporated therein the features of this invention, and is a view taken on the line 1—1 of Figure 2.
Figure 2:
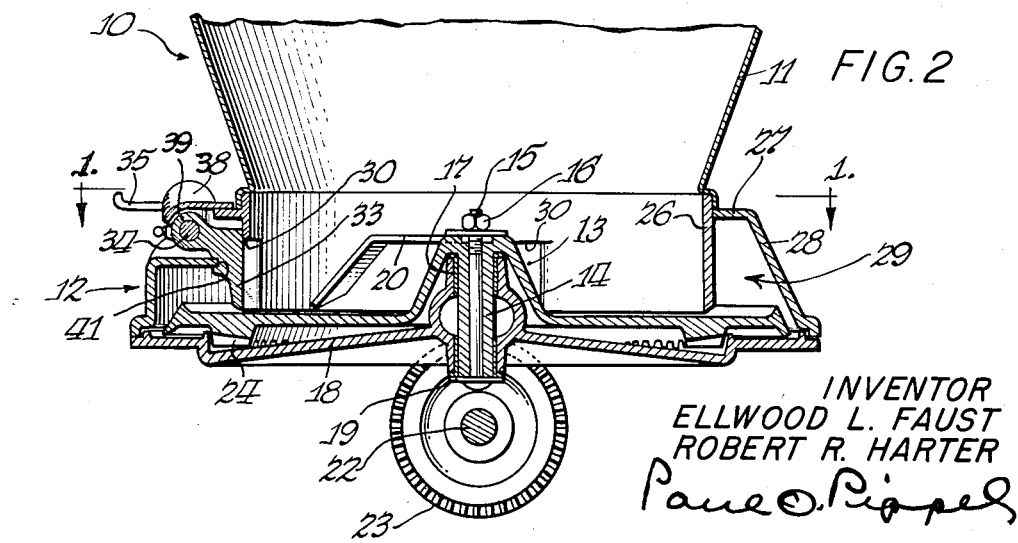
Figure 2 is a sectional elevation taken on the line 2—2 of Figure 1, showing the bottom of the fertilizer hopper and part of the drive mechanism for discharging the fertilizer.

Referring to the drawings, it will be observed that in Figures 1 and 2 the fertilizer distributor of this invention is generally designated by the numeral 10 and includes a hopper 11 extending generally vertically for the reception of fertilizer, and having a base portion 12. Fertilizer in the hopper 11 rests upon a rotatable base plate 13 having a hub portion 14 provided with a central bore to receive a spindle in the form of a bolt 15 threaded at one end to receive a nut 16.

The hub portion 14 is rotatable in a bearing 17 forming part of a bottom plate 18 and held in place by a collar 19 and the bolt 15. An agitator arm 20 is mounted to rotate with the plate 13 and functions to sweep lumps from the discharge openings. The entire fertilizer distributing unit is mounted upon a conventional frame designated at 21 which may support a plurality of similar fertilizer distributing units, and which further carries driving mechanism for operating the rotatable plate 13.

The plate 13 is driven through suitable gears, the drive shaft being designated at 22 and a gear thereon by the numeral 23. The teeth on gear 23 are adapted to mesh with teeth 24 arranged annularly about the periphery of the rotatable plate 13. Shaft 22 is driven through the intermediary of two or more sprocket wheels 25 driven from any suitable source of power, not shown.

The base 12 of the fertilizer distributor of this invention comprises an inner cylindrical wall portion 26 which extends vertically and forms a continuation of the lower portion of the walls of the hopper 11. The inner wall 26 is connected by a substantially horizontal top portion 27 with an exterior wall 28 which, with the inner wall 26 and the connecting member 27, forms a peripheral tunnel extending around the outside of the base of the hopper. This tunnel is generally designated by the numeral 29 and extends flange-like outwardly from the base of the receptacle, straddling the outer peripheral portion of the rotatable plate 13 which, with the bottom 18, forms the base of the hopper 11 as well as of the tunnel 29.

Fertilizer in the hopper 11 rests upon the plate 13, turns with the rotation thereof, brushes against the smooth interior of wall 26 of the hopper base and passes outwardly through outlets in the form of one or more openings 30 circumferentially formed therein. The flow of fertilizer through the openings 30 in the wall 26 of the hopper base is free and unimpeded since there is nothing projecting inwardly from the wall 26 in the path of the fertilizer to hinder its progress as the plate rotates and the fertilizer bears against the interior of the cylindrical wall 26. The flow of fertilizer through these openings is therefore uniform and the amount thereof is determined by the effective size of the opening. The effective size of the openings 30, and therefore the amount of fertilizer to be discharged from the hopper is regulated by closure mechanism now to be described.

In Figure 1 it will be noted that the direction of rotation of the plate 13 is anti-clockwise as indicated by the arrow. With reference to this direction of rotation of the plate 13 it will be noted particularly well in Figures 3 and 4 that the leading edge 31 of the opening 30 extends at an angle upwardly and rearwardly forming a triangular space therebetween and the plate 13. It will also be observed that the trailing edge 32 of the opening extends vertically and is flared outwardly to provide an edge lying in a vertical plane with the leading edge 31 tangent to the outer periphery of the inner wall 26 of the hopper base. An adjustable closure for the opening 30 is provided in the form of a rectangular gate 33 which is adapted to engage the edges of the opening 30 when the gate is closed and to extend tangentially of the wall 26. As the gate 33 is opened triangular openings are exposed and formed by the edge 31 of the opening, the rotatable plate 13 and the forward vertical edge of the flat gate member 33. The quantity of fertilizer discharged through the openings 30 may therefore be increased by the movement of the gate and the increase in size of these openings.

In carrying out the objects of this invention applicants have improved the discharge of fertilizer by inclining the edge 31 of the opening 30, and by mounting the gate 33 in such a way as to cause it to move upwardly as well as rearwardly as the opening 30 is uncovered. This gets the gate up and away from the plate to prevent accumulation of fertilizer. This is accomplished by the provision of a threaded shaft member 34 having a handle 35, opposite ends of which are rotatably received in flanges 36 and 37 of a bracket 38 affixed to the upper wall portion 27 of the tunnel member 29. Also mounted upon the threaded portion of the shaft 34 is a threaded boss 39 to which the gate 33 is affixed, as by welding, and depends therefrom. Rotation of the shaft 34 in the threaded boss 39 thus shifts gate 33 axially with respect to the shaft. In Figures 3 and 4 it will be noted that shaft 34 is arranged at an angle extending upwardly and rearwardly relative to the direction of rotation of the plate 13 so that the gate 33, instead of moving parallel to the plate 13 and at a uniform distance therefrom, moves upwardly and rearwardly at an angle with respect to the plate 13. Thus, in addition to the increments of triangular opening provided between the forward edge of the gate 33 and the leading edge 31 of the opening 30, additional discharge opening is provided between the lower edge of the gate and the surface of the plate 13. This additional opening under the gate 33 inhibits the accumulation of fertilizer, facilitates the discharge thereof and allows more accurate regulation of the quantities discharged.

The bracket 38 is preferably marked as indicated at 40 to facilitate the operator adjusting the position of the gate 33 by observing the position of the boss portion 39, the latter being on the outside of the receptable and therefore visible, while the gate 33 extends into the peripheral channel 29 through an opening 41 provided in the connecting portion 27. A suitable grease fitting 42 is provided and mounted upon the boss 39, and functions additionally as a position indicator or pointer.

It should be understood that the plate 13 forms the bottom of the tunnel 29 and that fertilizer passing through the openings 30 is carried around in the tunnel until it is met by a diverter in the form of a wall 43 indicated in dotted lines in Figure 1, affixed to the walls of the tunnel and substantially blocking the passage of fertilizer. Fertilizer engaging the walls 43, two of which are provided, is diverted over the edge of plate 13 and discharged into openings 44, also indicated in dotted lines in Figure 1, from which it is directed by suitable means, not shown, to the ground.

From the foregoing it should be clear that applicants have devised novel and efficient control means for regulating the discharge of fertilizer or the like from a hopper. It may likewise be understood, however, that the invention has been described in its preferred embodiment and that modifications may be made therein without departing from the spirit of the invention or the scope of the appended claims.

What is claimed is:

1. In a material distributor for fertilizer and the like, a hopper having a cylindrical wall, a rotatable plate at the base of the hopper forming the bottom thereof, the bottom of said wall having a least one circumferential opening formed therein to provide an outlet for the passage of material from the interior of the hopper during rotation of the base plate, a gate engageable with the outer periphery of the wall covering said opening and movable generally horizontally to selected positions to vary the effective size of the opening, the bottom edge of the gate being substantially parallel to the base plate, and means for moving the gate in a straight line tangentially of the outer periphery of the wall in a path upwardly at an angle to the plane of said base plate.

2. The invention set forth in claim 1, wherein the receding edge of the opening with respect to the direction of rotation of the plate is flared outwardly for engagement with said gate, and the gate is a flat member engaging the leading and trailing edges of the opening in a plane tangential to the hopper wall.

3. The invention set forth in claim 2, wherein the forward and rear edges of the gate are vertical, the lower edge is substantially parallel to the plane of the base plate and the gate is mounted for movement tangentially of the hopper wall upon a support mounted on the hopper on an angle upwardly with respect to the plane of the base plate.

4. In a material distributor for fertilizer and the like, a hopper having a cylindrical wall, a rotatable plate at the base of the hopper forming the bottom thereof, the bottom of said wall having a circumferential opening therein having its receding edge with respect to the direction of rotation of the plate generally vertical and flared outwardly to provide an outlet tangential to the wall of the hopper for the passage of material from the interior thereof and having its leading edge inclined downwardly in the direction of rotation, a rectangular gate adapted to cover said opening and movable tangentially of the hopper to expose a triangular opening between the forward leading edge and the plate, and means associated with the hopper and connected to the gate for moving the latter upwardly and away from the opening to accommodate passage of material below the gate as the size of the opening is increased.

5. The invention set forth in claim 4, wherein a second wall surrounds the hopper wall and is connected thereto to form the housing for an annular tunnel having an open bottom, wherein said base plate extends radially outwardly to form the tunnel bottom, and wherein the actuating means for moving the gate to uncover the material discharge opening is mounted on the tunnel housing.

6. In a material distributor for fertilizer and the like, a hopper having a cylindrical inner wall and a concentric outer wall defining a peripheral tunnel about said inner wall, a rotatable plate at the base of the hopper forming the bottom thereof and of the tunnel, the bottom of said inner wall having a circumferential opening formed therein for the unimpeded passage of material from the interior of the hopper to the tunnel during rotation of the base plate, the receding edge of said opening with reference to the rotation of the base plate being flared outwardly to provide an outlet to the tunnel tangential to the inner cylindrical wall of the hopper, a gate positioned in the tunnel tangential to said inner wall and covering said opening, means connected to the gate for moving it tangentially to vary the size of the opening and regulate the flow of material therethrough, said gate being movable at an angle upwardly on an incline upon movement thereof in the direction to enlarge the opening.

7. In a material distributor for fertilizer and the like, a hopper having a cylindrical inner wall and a concentric outer wall defining a peripheral tunnel about said inner wall, a rotatable plate at the base of the hopper forming the bottom thereof and of the tunnel, the bottom of said inner wall having a circumferential opening formed therein for the unimpeded passage of material from the interior of the hopper to the tunnel during rotation of the base plate, the receding edge of said opening with reference to the rotation of the base plate being flared outwardly to provide an outlet to the tunnel tangential to the inner cylindrical wall of the hopper, a gate positioned in the tunnel tangential to said inner wall and covering said opening, means associated with the hopper for moving the gate comprising a threaded shaft member mounted on the outside of the tunnel and extending tangentially of the inner wall of the hopper at an angle for the horizontal and a threaded carriage member on the shaft axially movable thereon by rotation of the shaft, the gate being attached to said carriage and having its lower edge parallel to the base plate.

References Cited in the file of this patent

UNITED STATES PATENTS

| 261,517 | Halteman | July 18, 1882 |
| 592,774 | Frazier | Nov. 2, 1897 |
| 1,243,631 | Ropp | Oct. 16, 1917 |
| 1,554,145 | Vugrinic | Sept. 15, 1925 |
| 1,731,515 | Andrews et al. | Oct. 15, 1929 |
| 1,772,874 | Meyer | Aug. 12, 1930 |
| 2,644,618 | Oehler | July 7, 1953 |